United States Patent [19]

Hollis, Jr. et al.

[11] Patent Number: 4,745,681

[45] Date of Patent: May 24, 1988

[54] CONTROLLED PIN INSERTION USING AIRFLOW SENSING AND ACTIVE FEEDBACK

[75] Inventors: Ralph L. Hollis, Jr., Yorktown Heights; Michael A. O'Connor, New York, both of N.Y.

[73] Assignee: International Business Machines Corporation, Armonk, N.Y.

[21] Appl. No.: 41,374

[22] Filed: Apr. 22, 1987

[51] Int. Cl.⁴ .......................... H05K 3/30; B23P 19/00
[52] U.S. Cl. ...................................... 29/837; 29/739; 29/741; 29/743; 901/45
[58] Field of Search ................. 29/741, 739, 837, 833, 29/838; 414/730; 901/45, 46; 33/169 C

[56] References Cited

U.S. PATENT DOCUMENTS

| | | | |
|---|---|---|---|
| 3,889,337 | 6/1975 | Shughart | 29/739 |
| 4,409,736 | 10/1983 | Seltzer | 901/45 X |
| 4,439,926 | 4/1984 | Whitney et al. | 901/45 X |
| 4,510,683 | 4/1985 | Fedde et al. | 29/741 X |
| 4,653,011 | 3/1987 | Iwano | 901/46 X |

OTHER PUBLICATIONS

IBM Tech. Disclosure Bull., vol. 16, No. 6, Nov. 1973, pp. 2037–2040 by Garrison et al.
IBM Tech. Disclosure Bull., vol. 22, No. 4, Sep. 1979, p. 1419 by DeMarco et al.
IBM Tech. Disclosure Bull., vol. 24, No. 10, Mar. 1982, pp. 4952–4953 by Brennemann.

*Primary Examiner*—Howard N. Goldberg
*Assistant Examiner*—Carl J. Arbes
*Attorney, Agent, or Firm*—Carl C. Kling; Philip J. Feig

[57] ABSTRACT

An automatic assembly apparatus or robot holds a pin in an instrumented gripper, moves open loop to the "detection region" in which airflow forces, primarily lateral forces, in the vicinity of the hole may be dependably sensed. Relatively large lateral airflow forces in the detection region are sensed and the pin is moved toward the hole. The airflow forces exhibit an abrupt force change as the pin reaches the insertion point within the "capture region" of the hole defined by the mechanical chamfer or significantly extended as a result of the virtual chamfer of airflow through the hole. The insertion point is the point where lateral X,Y force vectors balance to a null, where Z force readings change from complex X,Y,Z force vectors to simple Z force vectors. The controller commands an open loop move to place the pin within the detection region; then commands a closed loop move, using a skirt around the pin or the pin itself as a probe, and sampling the force vectors until the insertion point is detected; then commands a move in the Z direction to put the pin into the hole. Insertion success or failure is detected by sampling the Z force vectors for blockage by the plate, or by sampling pressure as the pin plugs the hole. Retry routines follow detection of any insertion failure.

15 Claims, 7 Drawing Sheets

CONTROLLED PIN INSERTION USING AIRFLOW SENSING AND ACTIVE FEEDBACK

BACKGROUND OF THE INVENTION

1. Field of the Invention

This invention relates to automatic assembly techniques, and more particularly relates to automatic sensing of the airflow at a hole, and moving a pin laterally to a position within the airflow where lateral forces of the sensed airflow most closely approach a null over the hole, to position the pin at the insertion point for the hole.

2. Description of the Prior Art

A recurring problem in automated assembly is the classic "pin-in-hole" problem wherein a cylindrical pin must be inserted into a cylindrical hole of closely matching diameter. A traditional approach is to put chamfers on the hole, the pin, or both, and to use compliant fixturing for gripping the pin. This approach fails if the pin and hole axes are separated by more than the capture region of the chamfers. This approach also fails in the case of flexible or curved pins, such as wires or filaments. Even the addition of vacuum suction will not extend the capture region of the hole much beyond the chamfer, that is, beyond a "virtual chamfer". The addition of vacuum suction to the hole can increase the capture region beyond that defined by mechanical chamfers, but due to the mass of large pins or fragility of small ones it may be difficult to achieve vacuum sufficient to increase the capture region of the hole significantly. Moreover, the geometry of the insertion problem may make it difficult to create a pressure differential across a hole which causes aiding airflow into the hole, while the same geometry may easily allow the opposite differential which causes resisting airflow from the hole. It might be outside the normal precision of the robot to go directly to the insertion position in open loop mode. It is difficult to achieve the optical and mechanical precision necessary for a closed loop approach, even with a vision-equipped robot, because the necessary precision is difficult to achieve and because the robot gripper, and indeed the pin itself, may obscure the hole.

The following patents are representative of the prior art:

U.S. Pat. No. 3,667,103, Edwyn H. Petree, APPARATUS FOR INSERTING TERMINALS IN AN APERTURED PLATE, June 6, 1974, shows the use of vacuum together with vibration to pull pins into chamfered holes in a plate.

U.S. Pat. No. 4,155,169, S.H. Drake et al, COMPLIANT ASSEMBLY SYSTEM DEVICE, May 22, 1979, shows the use of a compliant gripper to ease insertion of a pin into a hole.

U.S. Pat. No. 4,485,453, Taylor, DEVICE AND METHOD FOR DETERMINING THE LOCATION AND ORIENTATION OF A DRILLHOLE, Nov. 27, 1984, shows the use of a drill bit as a probe for a robot to use in determining the location of a drillhole.

German Patent No. DE28 34 6984, Petermann et al, Feb. 14, 1980, shows a vacuum assisted insertion technique for electrical components.

The prior art shows the use of vacuum in pin-in-hole operations, shows the use of a compliant gripper in pin-in-hole operations, and shows the use of instrumented grippers. The prior art thus shows the use of the chamfer capture region to capture the pin, and shows vacuum enhancement of the chamfer capture region (virtual chamfer) but fails to show any automatic techniques in a detection region, in the outer vicinity of the hole, which the robot can follow to position the pin at the insertion point for the hole. The prior art does not show and does not suggest the inventive combination, which allows the robot to respond to the forces of airflow through a hole, using sensors closely associated with the pin, or the pin itself, as a probe to direct and control motion of the pin to the insertion point within the capture region of the hole, perform the insertion, and detect successful insertion.

Nor does the prior art teach the method of positioning the pin in the general vicinity of the selected hole in open loop mode; searching for a null in lateral airflow forces in closed loop mode, to determine the insertion point; inserting the pin in open loop mode; and detecting successful insertion.

SUMMARY OF THE INVENTION

A part having holes for receiving pins is arranged for access by the insertion apparatus (e.g., an instrumented robot) with fluid flow into or from the holes, such as by airflow into vacuum. For each individual hole the fluid flow creates a detection region in which the lateral and vertical forces due to the hole can be detected, so that the direction to the hole can be derived. If the flow is from the hole this direction is opposite to the direction of the lateral force, whereas if the flow is into the hole the direction is the same as that of the lateral force.

The robot is open-loop controlled to position the robot gripper so that the pin is in the outer vicinity of the hole, within the detection region of the lateral force vectors of airflow through the hole. The robot, acting upon a sensor-equipped gripper or skirt about the pin, senses lateral forces acting upon the pin as a probe, or very closely related to the pin. The robot then acts in closed-loop (feedback) mode, moving the pin toward the insertion point derived from sensing the lateral forces, while continuously sensing the lateral force vectors. The robot uses go-with-the-flow (or go-against) servo techniques to drive the robot gripper into juxtaposition with the hole (within the insertion capture region of the hole) as defined by a null in the lateral force vectors. Upon sensing of the force vector changes resulting from the null, the robot moves the robot gripper vertically (downward, in open-loop mode) to insert the pin into the hole.

The object of the invention is to enable a manufacturing robot to place a pin into a hole even though the required alignments of pin and hole are beyond the global accuracy capability of the robot.

A feature of the invention is a force-vector-sensing, instrumented, compliant gripper to hold the pin as a probe in combination with a servomechanism controller to guide the pin to the virtual chamfer capture region of the hole.

The instrumented robot gripper produces signals related to direction and magnitude of the force. The controller receives the signals, calculates a lateral move sequence and commands the move sequence. During the move sequence, the controller responds to changes in the sensed lateral forces on the pin. At a position within the detection region at which lateral forces most closely approach a null, the null defines the capture region of the hole, which defines the insertion point.

The controller determines from the null that the robot gripper has positioned the pin at the insertion point, and commands the robot to drive the pin into the hole (or allows the pin to be vacuum-pulled in the hole in the case of light and/or flexible pins or filaments).

Another feature of the invention is the combination of a highly sensitive instrumented compliant gripper, to hold the pin and/or a probe skirt, with servo repositioning by the robot to the insertion position. For insertion, the instrumentation senses the lateral forces of airflow forming a capture region of a hole linking pressure differentials. The robot control computer iteratively calculates and commands a sequence of lateral moves, in response to iteratively sensed lateral forces to a position within the detection region at which lateral forces most closely approach a null. The null defines the capture region of the hole. The robot control computer determines from the null of lateral forces that the pin has been positioned at the insertion point, centered over the capture region formed by the airflow through the hole. It then commands a vertical move (or allows the pin to be vacuum-pulled in the hole if flow is into the hole and forces are sufficient.)

An advantage of the invention is its ability to insert fragile pins or wires, even flexible filaments, into unchamfered holes.

Another advantage of the invention is that it enables a manufacturing robot to carry out pin-in-hole operations even though pin and hole dimensions fall outside the open loop precision of the robot gripper.

The apparatus and method for controlled insertion of pins into holes using airflow detection and active feedback offers the following significant advantages:

(1) its applicability is general enough to handle situations using either vacuum or pressure on large or small pins which may be rigid or flexible or even fragile;

(2) it is self guiding in that the hole itself supplies directional information to the pin;

(3) during insertion, the high velocity air film in the annular space between the pin and the hole provides a lubricating function reducing the possibility of failure due to jamming;

(4) using the pin itself as a probe provides a spatially minimal sensing arrangement;

(5) since the detection region is typically much larger than the hole size, successful insertion can be initiated in a region much larger than the mechanical chamfer;

(6) it overcomes many classical problems of pin in hole insertion, i.e., small clearance, imprecise data, and/or lack of global accuracy of robots.

The foregoing and other objects, features and advantages of the invention will be apparent from the more particular description of the preferred embodiments of the invention, as illustrated in the accompanying drawings.

DESCRIPTION OF A PREFERRED EMBODIMENT OF THE INVENTION

Figure 1:
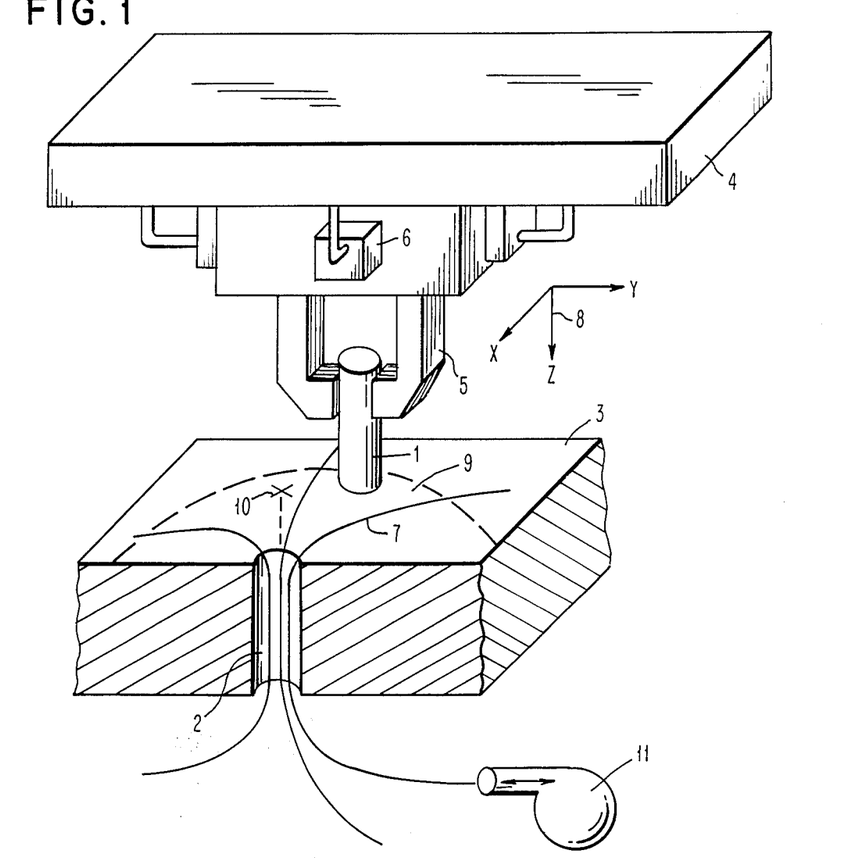
FIG. 1 is a semidiagrammatic presentation of an automatic positioning apparatus or robot, illustrating the instrumented gripper using the pin as a probe to sense airflow forces of the detection region of the hole.

FIG. 1 shows a basic embodiment of the apparatus for inserting pins in holes. The purpose is to place pin 1 in hole 2 of plate 3. The problem is due to the following considerations:

(1) the clearance between pin 1 and hole 2 may be small;

(2) the locations of pin 1 and hole 2 may not be known sufficiently accurately for insertion, due to measurement errors or to flexing of the pin;

(3) the apparatus 4 does not have sufficient global accuracy to complete insertion.

A pressure differential is applied across hole 2, by vacuum or pressurized air on either side of plate 3, creating flow lines 7. This causes measurable lateral and vertical forces on pin 1 when it is within the extended vicinity of hole 2, which might be several diameters.

Robot 4 includes instrumented gripper 5, which is equipped with force sensors 6. (These sensors are normally included within gripper 5, but for clarity are shown here external to the gripper.) Information from force sensors 6 is fed back to robot 4 for controlling repositioning of gripper 5. Pin 1 acts as its own probe. Once placed in the extended vicinity of hole 2, pin 1 is influenced by airflow through hole 2, illustrated by flow lines 7. The portion of the extended vicinity which is unambiguously affected by airflow of the selected hole 2 (and not some other hole) is accepted as detection region 9. The airflow includes vertical (Z) and horizontal (X,Y) force components relative to coordinate frame 8. The lateral components of these force vectors are detected by force sensors 6, and fed back to robot controller 4 to command repositioning to place pin 1 at the lateral force null which is directly over hole 2 and is accepted as defining the capture region of hole 2. This is the insertion point 10. Upon determining arrival of the pin 1 at the insertion point, the robot 4 activates a Z repositioning to move the pin 1 into the hole 2. Pump 11 supplies the appropriate fluid flow, usually vacuum, to provide fluid flow through hole 2 and flow force 7.

Figure 2:
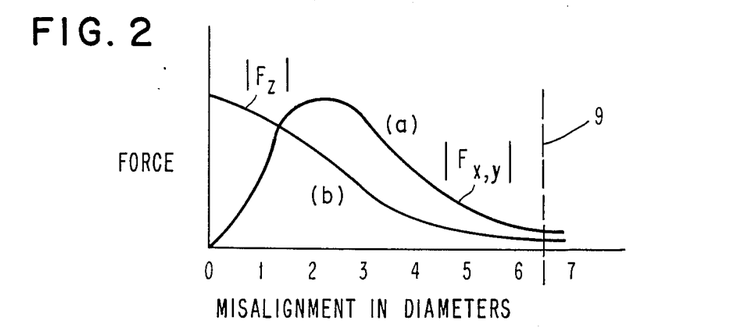
FIG. 2 is a graph of lateral and vertical components of force on the pin (as a probe) versus misalignment of pin and hole.

FIG. 2 is a schematic graph of the lateral and vertical components of force on pin 1 due to the flow lines 7 of FIG. 1. The pressure differential across the hole sets up a flow field in the vicinity of the hole which exerts lateral and vertical forces upon the pin. Sensible forces are present for distances up to several diameters away from the hole center, defining a relatively large detection region, more than six diameters in the example of FIG. 2. As the pin is moved closer into alignment with the hole, the lateral force increases to a maximum where the pin and hole are partially overlapping. The lateral force reaches a null as it approaches a (zero) when pin 1 and hole 2 are perfectly aligned. At the same time, the magnitude of the vertical force increases to a maximum when perfect alignment is reached (see FIG. 2). As shown in curve (a) of FIG. 2, the magnitude of the lateral force $F_{x,y}$ rises from a null at perfect alignment (0 diameters misalignment) to a maximum adjacent the hole, then tapers off as distance from the hole increases. Curve (b) in FIG. 2 shows the magnitude of the axial force associated with the hole, assuming the pin 1 is quite close to the surface of the block 3. Force $F_z$ peaks at perfect alignment.

Up to this point it has not been necessary to distinguish between the case of flow into the hole from the case of flow out of the hole. For clarification, flow "into" the hole is defined to be a flow which is caused by having a pressure greater on the same side of the hole as the pin than on the other side. Flow "from" the hole is defined to be a flow of the opposite direction. The two cases of flow are illustrated in FIGS. 3–6.

Figure 3:
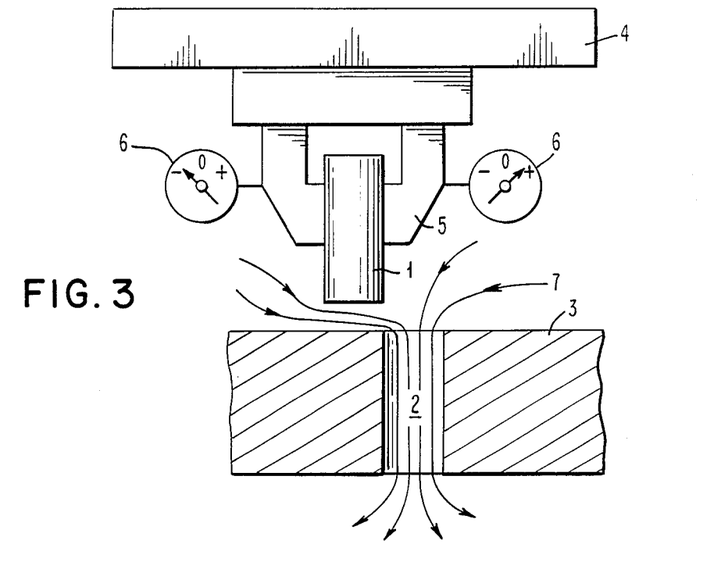
FIG. 3 is a schematic drawing showing lateral air flow force sensing when flow is into hole and pin and hole are misaligned.

FIG. 3 is a schematic diagram of the case of flow into the hole and a misalignment of pin 1 and hole 2. Flow lines 7 cause forces on pin 1 which are detected by sensors 6, one each in the left and right fingers of gripper 5. As shown in FIG. 3 the left sensor registers a negative force value while the right sensor measures a corresponding positive force value. The robot controller uses this information to command a movement of the pin 1 towards the hole 2 (i.e., in the direction of the sensed force).

Figure 4:
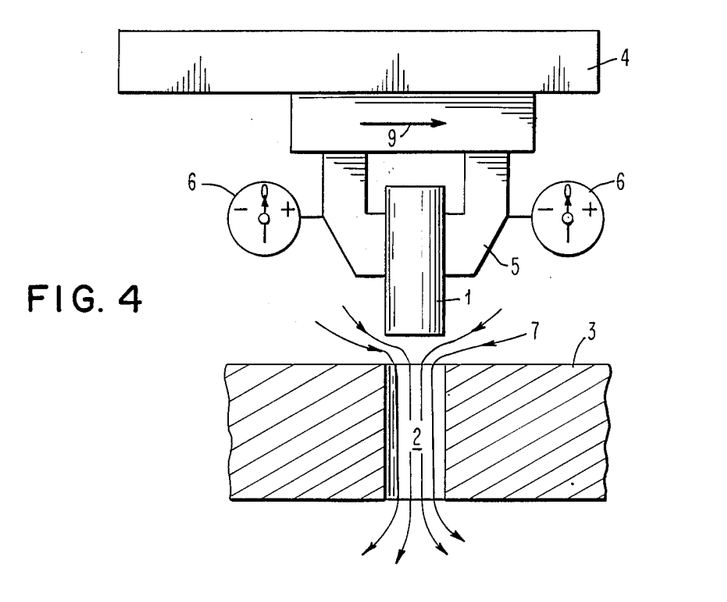
FIG. 4 is the same as FIG. 3 after alignment of pin and hole.
Figure 5:
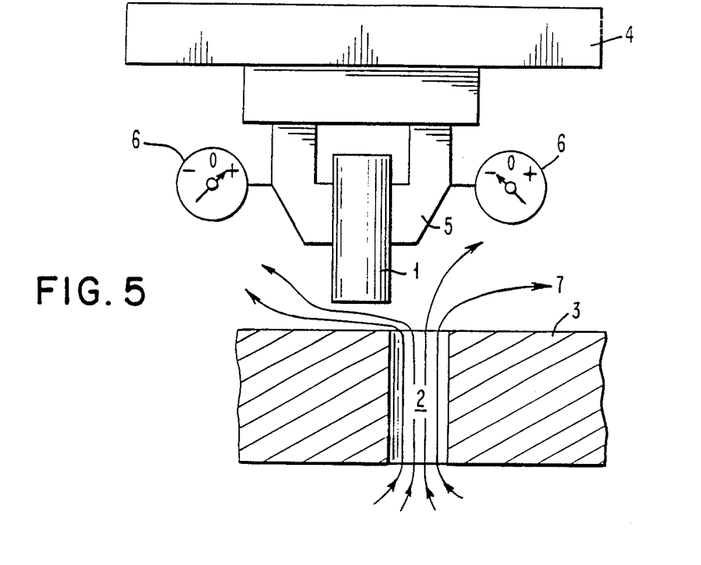
FIG. 5 is the same as FIG. 3 except flow is out of hole.
Figure 6:
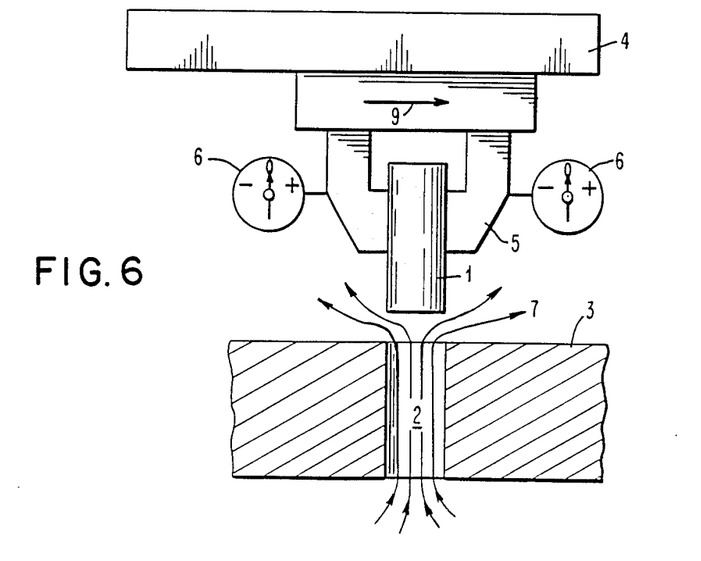
FIG. 6 is the same as FIG. 4 except flow is out of hole.

In FIG. 4 the gripper 5 has moved in the direction of arrow 9 to bring the pin 1 into vertical alignment with hole 2. Left and right force sensors 6 register a force value, indicating the null of lateral forces which distinguishes this position. FIGS. 5 and 6 are equivalent to FIGS. 3 and 4, but are for the case of flow out of the hole. The primary difference is that the movement commanded must be in the direction opposite to that of the sensed forces.

The success of the invention depends on the ability to measure the forces in the detection region of the hole 2. These forces act upon the pin 1 due to airflow 7 associated with the hole 2. A control system interprets these forces and generates appropriate motions.

Figure 7:
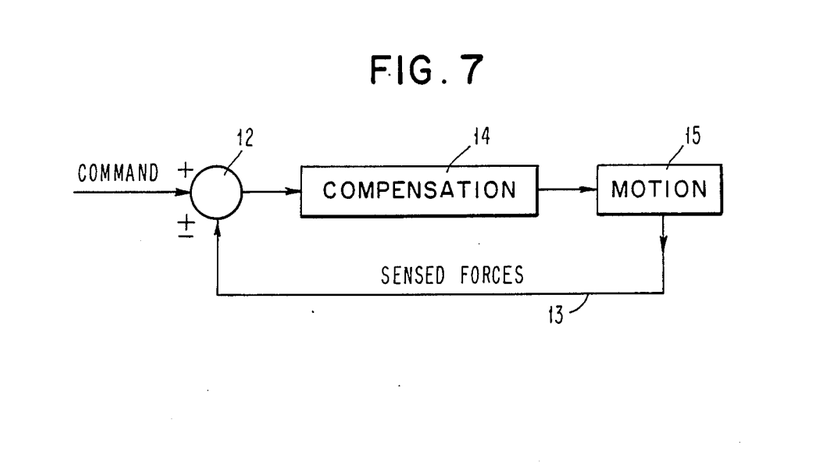
FIG. 7 is a block diagram of the closed loop operation of the apparatus or robot.

FIG. 7 shows diagrammatically how these forces are incorporated in a feedback loop. The detection region is a truncated cone containing the aperture of the hole in which the dominant forces on the pin are due to the primary flow; that is, the forces due to secondary induced flows are negligible. For flow into a hole, the angle of this cone approaches the half space of the plate surface and the flow is mainly laminar. For flow out the cone is narrower and somewhat taller, but with a dominant overall direction. In either case a detection region is created with a horizontal cross section away from the plate surface several diameters larger than the hole diameter and a vertical height several times the hole radius. The forces within this detection region are typically large enough to be measured by commercially available force sensors such as resistive or the semiconductor type strain gauges found in the IBM 7565 robot. Referring to FIG. 7 in conjunction with FIG. 1, the feedback loop can be discrete samples of iterative steps (iterative closed loop mode) or of a continuous nature (continuous closed loop mode).

The command from robot controller 4 appears at node 12 and is mixed with sensory data on line 13, sent to compensation 14 and interpreted as a motion control directive at 15.

In the iterative approach the force on the pin 1 is measured by the force sensors 6, and the control system 4 determines the direction to the hole 2 from the direction of the force 7, and determines proximity to the hole 2 from the magnitude of the force 7. The control system 4 then commands a move, in the correct direction, of size inversely proportional to the magnitude. During the move, the system tests for the null of lateral forces indicating arrival at the capture region, and this sequence is repeated if necessary. In the continuous closed loop mode approach, forces are continuously sensed and position and velocity corrections are made during the motion. Many texts on the theory of control systems discuss systems of this nature, and more particularly control systems in robotic applications similar to this are considered in *Robot Motion: Planning and Control*, edited by Michael Brady, et al., The MIT Press, Cambridge, Mass., 1982.

As previously discussed, there are two major cases of flow—namely flow into the hole and flow out of the hole. In the first case, an additional control strategy can be employed. Within the detection region of the hole a smaller region, which contains the capture region, may exist. In this region, which is denoted the "virtual chamfer" region, the virtual chamfer forces on the pin 1 are sufficient to seat and insert the pin in the hole 2 passively. When the control determines the pin's position in the virtual chamfer, it can switch from force controlled mode to a passive compliant mode for seating and insertion of the pin. This go-with-the-flow technique can be most advantageous in situations requiring insertion of small or flexible pins or filaments.

The control system can sense successful insertion by several strategies by noting:

(1) the Z position of the gripper;
(2) large restoring lateral forces in response to small lateral motions;
(3) pressure change registered by an auxiliary pressure sensor.

In the case where airflow is directed into the hole, the method and apparatus offers the following additional advantages:

(1) the flow pattern is simpler and the detection region is larger; (2) the active go-with-the-flow control strategy in effect amplifies the airflow force by many times; (3) after detection of the virtual chamfer region, by allowing the forces due to the airflow to draw the pin 1 into the hole 2, or by switching from active force control to passive compliance, a virtual chamfer much larger than the mechanical chamfer is created. (4) it is applicable in the case of semiflexible or even very flexible pins or filaments; for example, it is useful in insertion of optical fibers or print wires in holes where pushing is difficult or impossible.

Figure 8:
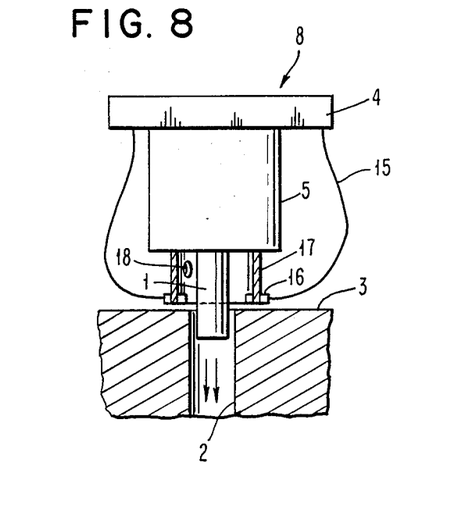
FIG. 8 is a semidiagrammatic view of instrumentation with sensors carried at the hem of a skirt concentric with the pin.

FIG. 8 shows an alternative placement and type of sensors for the lateral forces of airflow through hole 2.

The lateral airflow forces are sensed by hot wire anemometers (or other devices) 16 carried at the hem of skirt 17, so as to be very near to plate 3. The skirt 17 is relieved by one or more vents 18 so as not to create turbulence in the lateral airflow forces 7. The lateral airflow is thus sensed directly, at a position very near to the hole; the relationship between skirt 17 and pin 1 is concentric or otherwise known, so that the computer can determine the appropriate locations.

SPECIFIC USAGES

Assembly of Wire Matrix Print Heads

Wire matrix printers have become very popular as peripherals for microprocessor-based small computers. A major factor in their success has been their relatively low cost. Fully automated assembly can drive the base manufacturing cost of such printers even lower. A major impediment to achieving fully automated assembly is the wire matrix printhead itself. Here, several tiny wires must be carefully threaded through a series of focusing plates, each having guide holes to direct the wires to a line focus at the printing paper.

Figure 9:
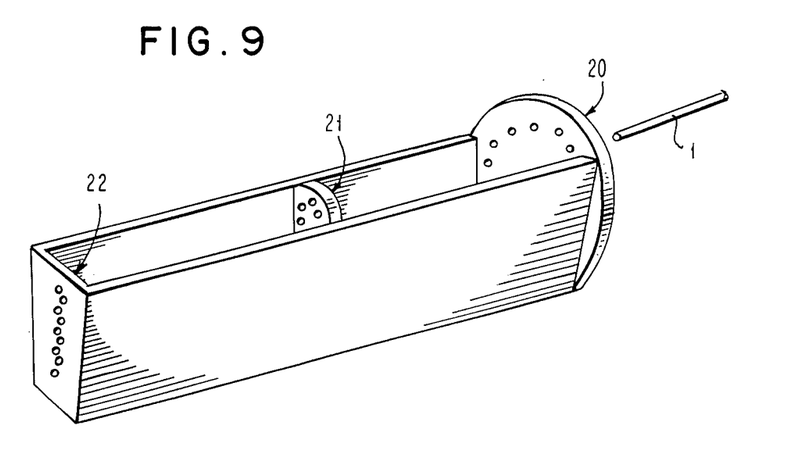
FIG. 9 is a semidiagrammatic view of a typical three focusing stage wire matrix print head illustrating a specific problem in which the invention is applicable.

A typical example of a three-plate-focusing print head is seen in FIG. 9. It has been proposed to use robots to assemble the wires in the printhead. By means of programmable and hard tooling, the printhead body is oriented at the proper position and angle in space for insertion of wires, one at a time. A difficulty with such a scheme is the extremely close tolerances which are involved, and the delicacy of the wires. The holes in the body must be perfectly aligned, and cannot be much larger than the diameter of the wires. Lead-in chamfers on the holes help, but are limited by the close proximity of adjacent holes. Finally, if the wires themselves are bent even slightly, they will not pass through holes in all focussing plates, or will be incorrectly aligned, and may even pass through the wrong holes.

A pressure differential across the hole of nearly one atmosphere ($1.013 \times 10^6$ dynes/cm$^2$) is easy to provide and makes it easy to sense changes as they occur. Assuming the wire diameter to be 0.25 millimeter, the maximum force generated on a print wire in the hole is approximately 500 dynes. As wire 1 approaches the hole 2 with some misalignment, a fraction of this maximum force exerts a measurable lateral component in the detection region. This force is sufficient to servo the wire with a go-with-the-flow strategy to a smaller capture region for insertion. If, for example, 30% of the force acts laterally, then the sideways force on pin 1 is about 150 dynes at the pin 1 approaches the hole. The pin tip will respond to this force if it is held in a compliant manner, or if pin 1 is sufficiently flexible to bend slightly.

It is difficult to analyze the problem's dynamics well enough to predict the size and shape of the detection region and the virtual chamfer, but it is a multiple of the actual chamfer, depending upon pin variables and the sensitivity of the force sensors.

Figure 10:
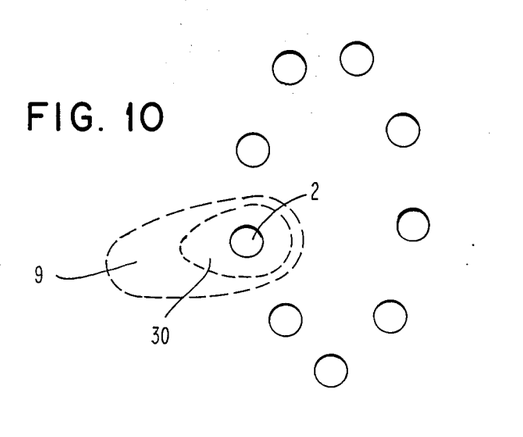
FIG. 10 is a schematic of detection and capture regions for a typical hole of a stage of the wire print head illustrated in FIG. 9.

The presence of more than one hole further complicates the analysis of the situation due to the presence of competing forces, but the planar regions for a particular hole are still a multiple of the hole diameter. Experimentation with a stage similar to the second stage 21 of FIG. 9, but in an unconstrained configuration, has shown detection and capture regions similar to regions 9 and 30 of FIG. 10.

Figure 11:
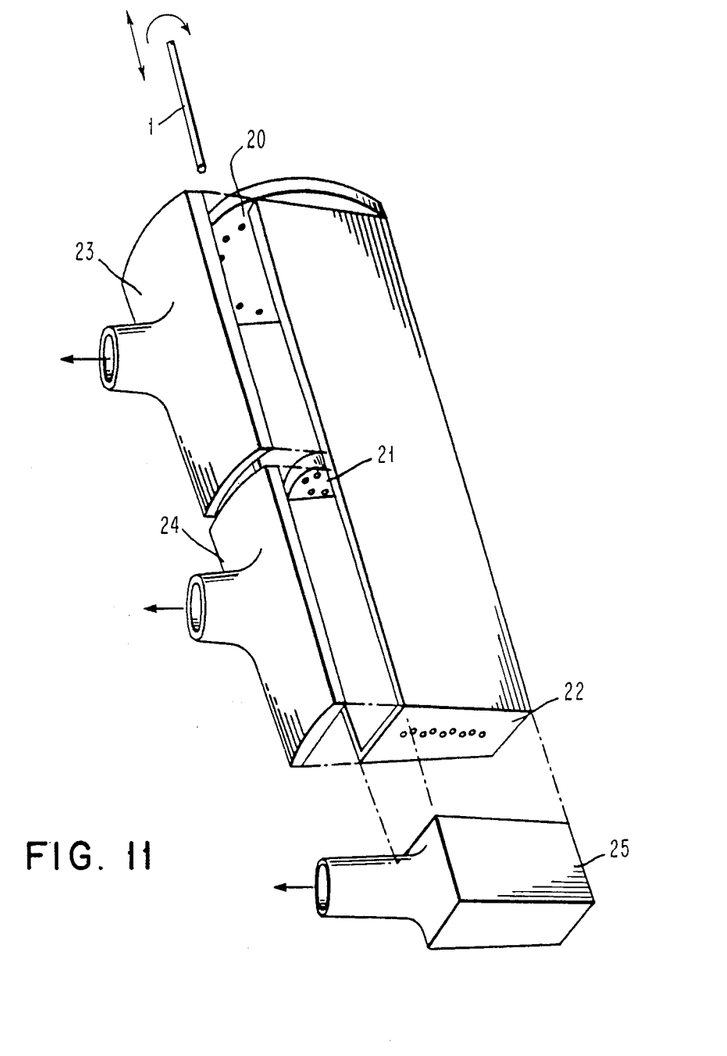
FIG. 11 illustrates a fixture for placing printwires into a housing having three plates with three holes in series for each printwire.

Several strategies are possible for providing the necessary airflow through the holes. One possibility is a fixture for sequentially evacuating chambers as shown in FIG. 11. Each plate 20, 21, 22 is equipped with a vacuum-source-equipped cover 23, 24, 25 which forms a progressive sequence of vacuum chambers, cover 25 defining the highest vacuum of the three chambers.

Figure 12:
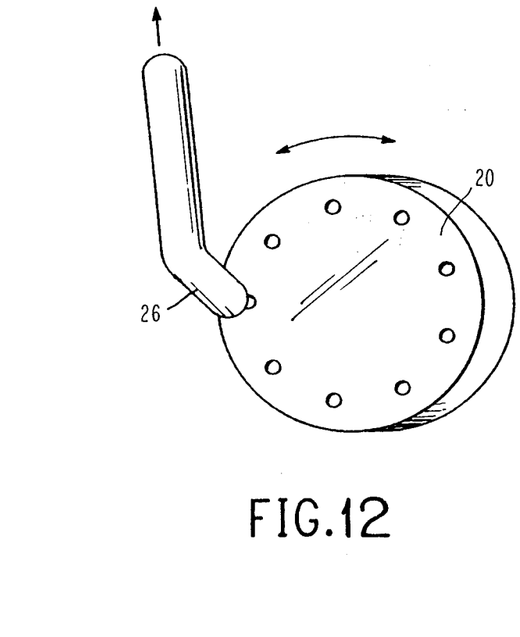
FIG. 12 shows a fixture for supplying airflow individually to a selected hole.

FIG. 12 shows a second method to mount a nine-wire printhead assembly on an indexable fixture with nine angular positions (one position for each of the nine holes), using a small movable vacuum suction line 26. Suction line 26 moves in and out in a linear fashion to cover each of the nine holes separately. A successful wire insertion can be detected by noting the slight change in pressure which occurs when the wire blocks off the hole, using a simple pressure operated microswitch (not shown).

Aircraft Skin Riveting

Figure 13:
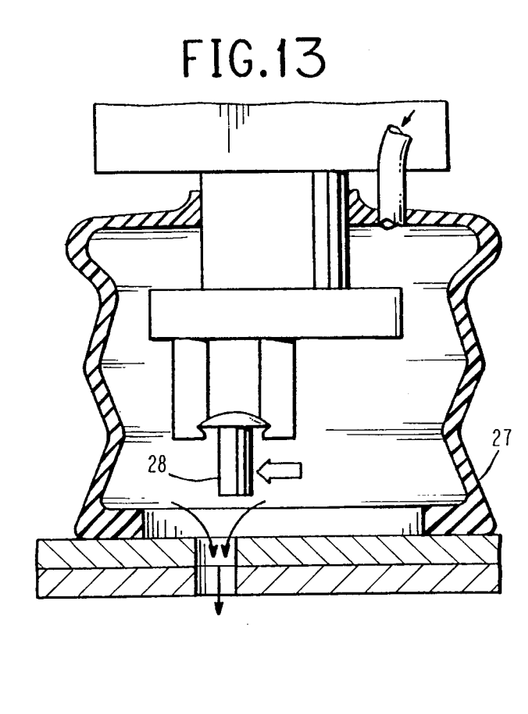
FIG. 13 shows a fixture for supplying airflow within a bellows on the pin side of the hole.

Another specific usage of the invention is in placement of rivets in sheet metal, such as aircraft skins. This is shown in FIG. 13. For some types of rivets, it is undesirable to provide a mechanical chamfer on the hole since it reduces the amount of material available for forming the clinched head on the back side. On the other hand, taking away the chamfer makes robotic assembly extremely difficult. Endpoint sensing of the rivet-hole geometric relationship can be used to guide the robot if a suitable sensor can be found.

This invention provides an almost ideal endpoint sensor for this application, using either passive or active guidance (described above) for reliably placing the rivet above the insertion capture region of the hole. For riveting aircraft skins, for example, it is better to apply pressure to the rivet side of the hole, or pressurize the back side of the hole, rather than apply suction to the back side of the hole. Pressurization of the rivet side of the hole is achieved using a flexible rubber cup 27 around the rivet 28. Sensing of lateral forces takes place as described with respect to FIG. 1. Alternatively, the back side of the hole could be pressurized by pumping air into the entire aircraft assembly, such as a wing section.

METHOD

The method for pin-in-hole insertion by a robot comprises the steps of:

(a) applying airflow through at least the selected hole (2) for insertion of a pin (1), creating a pattern of detectable airflow forces (7) within a detection region about the hole (2);

(b) moving the pin (1) by open-loop positioning to place within the detection region;

(c) sensing the airflow by airflow sensing means (6,16) closely associated with the pin (1);

(d) following the airflow-forces sensed by the airflow-sensing means (6,16) by closed-loop positioning through at least one sensing and airflow-following servo move in the (x,y) direction of changing lateral airflow force, thus moving the pin (1) toward the hole (2);

(e) repeating said sensing the airflow step (c) and said following the airflow-forces step (d) until an airflow null is sensed defining the insertion point 10 at the capture region of the hole (2); and (f) commanding an entry move (z direction) of the pin (1) into the selected hole (2) at the insertion point (10) which is within the mechanical or virtual chamfer capture region of the hole (2).

The method also may include power drive into the hole by further comprising the steps of:

(g) sensing a composite of pressure and z forces, using the pin (1) as a probe, during a z move, (h) detecting a blockage as a function of the composite of pressure and z forces; and (i) commanding backup and retry.

The method requires simple changes for use with pressure or with vacuum. Airflow is out of or into the hole 2. The servo is a fight-the-flow servo for flow out of the hole, and a follow-the-flow servo for flow into the hole. The actual pin insertion must be powered, at least by gravity, to overcome the forces of the flow in case of flow out of the hole. In case of flow into the hole the airflow forms a virtual chamfer which greatly extends the mechanical chamfer capture region, and helps pull the pin 1 into the hole 2.

Atmospheric air is the choice for most operations, because of its purity and availability. Other fluids may be advisable in certain cases. Such fluids might include water, hydraulic oils, and such gases as nitrogen or helium.

Whereas the invention has been shown and described with respect to preferred embodiments, using vacuum and using pressure, using the pin itself as a probe and equipping a skirt about the pin as a probe, it will be apparent that those skilled in the art will be aware of related techniques for sensing relatively small airflow forces surrounding a hole, and related techniques for following those small airflows using robotic techniques of power drive, so that a relatively fragile or flexible filamentary pin may be placed in a hole located by lateral force vectors of fluid flow through the hole, acting upon sensors associated with the pin and used to guide the positioner carrying the filament to the hole.

What is claimed is:

1. An automatic assembly system for inserting a pin in a hole in a plate, characterized by:

(a) control means (4) for positioning pin (1) laterally in the vicinity of a selected hole (2) in the plate (3), in position within the detection region (9) of the hole (2);

(b) fluid flow means (11) associated with the plate (3), to form a pressure differential creating fluid flow (7) through at least one hole in the plate (3), including said selected hole (2);

(c) fluid flow sensing means (6), associated with said control means (4) for positioning the pin (1) to sense the fluid flow (7) at the selected hole (2) and to supply force vector signals indicative of such forces;

(d) servo means, responsive to feedback from said fluid flow sensing means (6) to said control means (4), to supply information for positioning the pin (1) within the detection region of the selected hole at the insertion point (10) which is within the capture region of the selected hole (2) as defined by the composite of mechanical and virtual chamfers determined by a change of the force vector signals related to the null where lateral forces (7) of fluid flow through the selected hole (2) balance over the selected hole (2);

whereby the system provides power steering of the pin (1) to the insertion point (10) for the selected hole (2).

2. An automatic assembly system according to claim 1, further characterized in that said fluid flow means (b) includes a vacuum source (11) on the side of the plate (3) opposite said pin (1).

3. An automatic assembly system according to claim 1, in that said fluid flow means (b) includes a constricted fluid flow mechanism (26, 27) for selectively creating fluid flow at a selected hole (2).

4. An automatic assembly system according to claim 1, in that said fluid flow means (b) is a flexible cup (27) surrounding at least one hole (2) to create an airflow chamber.

5. An automatic assembly system according to claim 1, wherein said fluid flow sensing means (6) includes a skirt (17) having a hem close to the plate (3) and encompassing said pin (1) and carrying a plurality of flow sensors (16) at its hem.

6. An automatic assembly system according to claim 5, wherein said flow sensors (16) are hot wire anemometers.

7. An automatic assembly system according to claim 1 wherein said fluid flow means (b) comprises means (23-25) forming a plurality of airflow chambers in tandem, and wherein the first airflow chamber of said plurality of airflow chambers and subsequent airflow chambers exhibit differing force vectors as a result of position, and therefore provide differing force vector patterns as the filament (1) reaches the region of the selected hole:

further characterized by means to identify the appropriate force vectors for such subsequent airflow chambers as the pin (1) reaches the capture region of the selected hole and means to alter the attitude of the pin (1) accordingly.

8. A robot positioning system according to claim 7 wherein said sensing means (6) also senses vertical forces, to go with the flow vertically in the subsequent airflow chambers.

9. A robot positioning system according to claim 7 wherein said sensing means (6) also senses vertical blockage, and feeds back a blockage signal; and wherein said servo means (d) commands a backup and retry.

10. A robot position system according to claim 7 wherein said sensing means (6) also senses change in vacuum partial pressure as a function of plugging of the selected hole by said pin (1), and feeds back a vacuum change signal to said robot (4) control means (a) for use in identifying insertion of the pin (1) in hole 2.

11. A robot positioning system according to claim 8 wherein said servo means includes lateral displacement means positioned outboard of the first airflow chamber, and said control means (b) commands a delicate lateral displacement of the pin (1) outboard said first chamber to cause small lateral movements of the end of pin (1) inboard said first airflow chamber during positioning or backup and retry.

12. A robot position system according to claim 7 wherein said servo means (d) commands a delicate rotation of the pin (1) during backup and retry.

13. A method for pin-in-hole insertion by a robot comprising the steps of:

(a) applying airflow through at least the selected hole (2) for insertion of a pin (1), creating a pattern of detectable airflow forces (7) within a detection region about the hole (2);

(b) moving the pin (1) by open-loop positioning to place within the detection region;

(c) sensing the airflow by airflow sensing means (6,16) closely associated with the pin (1);

(d) following the airflow-forces sensed by the airflow-sensing means (6,16) by closed-loop positioning through at least one sensing and airflow-following servo move in the (x,y) direction of changing lateral airflow force, thus moving the pin (1) toward the hole (2);

(e) repeating said sensing the airflow step (c) and said following the airflow-forces step (d) until an airflow null is sensed defining the insertion point 10 at the capture region of the hole (2); and (f) commanding an entry move (z direction) of the pin (1) into the selected hole (2) at the insertion point (10) which is within the composite mechanical/virtual chamfer capture region of the hole (2).

14. The method of claim 13, in which said step (f) further comprises:

sensing Z forces, using the sensing means closely associated with the pin (1) during a Z move;
detecting a blockage as a function of the Z forces; and
commanding backup and retry.

15. The method of claim 13, in which said step (e) further comprises:

sensing changes in pressure due to plugging of the selected hole (2) by the pin (1) during a move, and feeding back the pressure change information for use in identifying insertion of the pin (1) in the selected hole.

* * * * *